(12) United States Patent
Armstrong et al.

(10) Patent No.: US 10,890,680 B2
(45) Date of Patent: Jan. 12, 2021

(54) USE OF EXTERNAL DRIVER TO ENERGIZE A SEISMIC SOURCE

(71) Applicant: PGS Geophysical AS, Oslo (NO)

(72) Inventors: Bruce Allan Armstrong, Dartmouth (CA); Janis Breton Nams, Halifax (CA); Paul Stanley Yeatman, Dartmouth (CA); Dainis Logan Nams, Halifax (CA)

(73) Assignee: PGS Geophysical AS, Oslo (NO)

( * ) Notice: Subject to any disclaimer, the term of this patent is extended or adjusted under 35 U.S.C. 154(b) by 318 days.

(21) Appl. No.: 15/991,643

(22) Filed: May 29, 2018

(65) Prior Publication Data
US 2018/0275304 A1 Sep. 27, 2018

Related U.S. Application Data

(63) Continuation of application No. 14/942,470, filed on Nov. 16, 2015.

(60) Provisional application No. 62/086,601, filed on Dec. 2, 2014.

(51) Int. Cl.
*G01V 1/38* (2006.01)
*G01V 1/133* (2006.01)

(52) U.S. Cl.
CPC ............ *G01V 1/3861* (2013.01); *G01V 1/133* (2013.01); *G01V 1/38* (2013.01)

(58) Field of Classification Search
USPC ........................................................ 367/143
See application file for complete search history.

(56) References Cited

U.S. PATENT DOCUMENTS

| 3,384,868 A | 5/1968 | Brown |
| 3,978,940 A | 9/1976 | Bouyoucos |
| 3,990,034 A | 11/1976 | Abbott |
| 4,185,714 A | 1/1980 | Pascouet et al. |
| 4,211,301 A | 7/1980 | Mifsud |
| 4,231,112 A | 10/1980 | Massa |
| 4,483,411 A | 11/1984 | Mifsud |
| 4,492,285 A | 1/1985 | Fair et al. |
| 4,525,645 A | 6/1985 | Shirley et al. |

(Continued)

FOREIGN PATENT DOCUMENTS

| FR | 1397142 | 3/1965 |
| WO | 0071266 | 11/2000 |

(Continued)

OTHER PUBLICATIONS

EP Search Report for Application No. 15865856.7 dated Jun. 19, 2018.

(Continued)

*Primary Examiner* — James R Hulka

(57) ABSTRACT

Disclosed are seismic sources that may utilize an external driver to energize the air in the seismic source for generation of acoustic energy. An apparatus for generating acoustic energy may comprise a seismic source comprising an internal cavity configured to contain a fluid. The apparatus may further comprise a piston external to the seismic source and in fluid communication with the internal cavity, wherein the piston operable to energize the fluid in the internal cavity of the seismic source. The apparatus may further comprise a linear motor coupled to the piston.

23 Claims, 11 Drawing Sheets

(56) References Cited

U.S. PATENT DOCUMENTS

| | | | |
|---|---|---|---|
| 4,556,963 A | 12/1985 | Hugus et al. |
| 4,557,348 A | 12/1985 | Mifsud |
| 4,578,784 A | 3/1986 | Mifsud |
| 4,689,997 A | 9/1987 | Windisch |
| 4,739,859 A | 4/1988 | Delano |
| 4,753,316 A | 6/1988 | Bouyoucos et al. |
| 4,785,430 A | 11/1988 | Cole |
| 4,850,449 A | 7/1989 | Cheung |
| 4,853,905 A | 8/1989 | Myers |
| 5,016,228 A | 5/1991 | Arnold et al. |
| 5,050,129 A | 9/1991 | Schultz |
| 5,062,089 A | 10/1991 | Willard et al. |
| 5,126,979 A | 6/1992 | Rowe, Jr. et al. |
| 5,206,839 A | 4/1993 | Murray |
| 5,225,731 A | 7/1993 | Owen |
| 5,233,570 A | 8/1993 | Donskoy |
| 5,302,782 A | 4/1994 | Owen |
| 5,579,287 A | 11/1996 | Boucher et al. |
| 5,646,380 A | 7/1997 | Vaage |
| 5,694,374 A | 12/1997 | Ripoll et al. |
| 5,757,726 A | 5/1998 | Tenghamn et al. |
| 5,757,728 A | 5/1998 | Tenghamn et al. |
| 5,959,939 A | 9/1999 | Tengham et al. |
| 5,978,316 A | 11/1999 | Ambs |
| 6,009,047 A | 12/1999 | Barger |
| 6,076,629 A | 6/2000 | Tengham |
| 6,076,630 A | 6/2000 | Ambs |
| 6,041,888 A | 7/2000 | Tengham |
| 6,085,862 A | 7/2000 | Tenghamn |
| 6,230,840 B1 | 5/2001 | Ambs |
| 6,173,803 B1 | 11/2001 | Barger |
| 6,404,106 B1 | 6/2002 | Dale et al. |
| 6,464,035 B1 | 10/2002 | Chelminski |
| 6,556,510 B2 | 4/2003 | Ambs |
| 6,606,958 B1 | 8/2003 | Bouyoucos |
| 6,624,539 B1 | 9/2003 | Hansen et al. |
| 6,711,097 B1 | 3/2004 | Engdahl |
| 6,851,511 B2 | 2/2005 | Tenghamn |
| 7,468,932 B2 | 12/2008 | Tenghamn |
| 7,539,079 B2 | 5/2009 | Hoogeveen et al. |
| 7,551,518 B1 | 6/2009 | Tenghamn |
| 7,562,740 B2 | 7/2009 | Ounadjela |
| 7,881,158 B2 | 2/2011 | Tenghamn |
| 7,926,614 B2 | 4/2011 | Tenghamn et al. |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,205,711 B2 | 6/2012 | Hopperstad et al. |
| 8,261,875 B2 | 9/2012 | Eick et al. |
| 8,331,198 B2 | 12/2012 | Morozov et al. |
| 8,335,127 B2 | 12/2012 | Tenghamn |
| 8,342,288 B2 | 1/2013 | Eick et al. |
| 8,400,872 B2 | 3/2013 | Gulgne et al. |
| 8,427,901 B2 | 4/2013 | Lunde et al. |
| 8,441,892 B2 | 5/2013 | Morozov et al. |
| 8,446,798 B2 | 5/2013 | Tenghamn |
| 8,630,149 B2 | 1/2014 | Thompson et al. |
| 8,634,276 B2 | 1/2014 | Morozov et al. |
| 8,670,292 B2 | 3/2014 | Engdahl |
| 8,804,462 B2 | 8/2014 | Barbour et al. |
| 8,909,480 B2 | 12/2014 | Wei et al. |
| 8,971,152 B2 | 3/2015 | Chelminski |
| 9,348,042 B2 | 5/2016 | Sallas |
| 2004/0112594 A1* | 6/2004 | Aronstam ............ G01V 1/133 166/249 |
| 2006/0193203 A1 | 8/2006 | Tenghamn et al. |
| 2008/0253226 A1 | 10/2008 | Tenghamn et al. |
| 2009/0147626 A1 | 6/2009 | Vahida et al. |
| 2009/0279387 A1 | 11/2009 | Tenghamn et al. |
| 2010/0118646 A1 | 5/2010 | Tenghamn |
| 2010/0118647 A1 | 5/2010 | Tenghamn |
| 2010/0322028 A1 | 12/2010 | Tenghamn |
| 2011/0038225 A1 | 2/2011 | Tenghamn |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0162906 A1 | 7/2011 | Harper |
| 2011/0297476 A1 | 12/2011 | Harper et al. |
| 2011/0317515 A1 | 12/2011 | Tenghamn |
| 2012/0075955 A1 | 3/2012 | Dean |
| 2012/0081997 A1 | 4/2012 | Babour et al. |
| 2012/0113747 A1 | 5/2012 | Ferber |
| 2012/0120759 A1 | 5/2012 | Le Page et al. |
| 2012/0147699 A1 | 6/2012 | Dellinger et al. |
| 2012/0147709 A1 | 6/2012 | Zowarka, Jr. et al. |
| 2012/0155217 A1 | 6/2012 | Dellinger et al. |
| 2012/0188845 A1 | 7/2012 | Jeffryes |
| 2012/0232780 A1 | 9/2012 | Delson et al. |
| 2012/0271551 A1 | 10/2012 | Wei et al. |
| 2012/0314536 A1 | 12/2012 | Bagaini |
| 2013/0037342 A1 | 2/2013 | Engdahl |
| 2013/0100777 A1 | 4/2013 | Ruet |
| 2013/0163386 A1 | 6/2013 | Sallas et al. |
| 2013/0163389 A1 | 6/2013 | Marhaben |
| 2014/0208841 A1* | 7/2014 | Hausot ............... G01N 1/12 73/152.24 |
| 2014/0334254 A1 | 11/2014 | Zrostlik et al. |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 | 3/2015 | Tenghamn et al. |
| 2015/0085607 A1 | 3/2015 | Tenghamn |
| 2015/0085608 A1 | 3/2015 | Tenghamn et al. |

FOREIGN PATENT DOCUMENTS

| | | |
|---|---|---|
| WO | 2015063209 | 5/2015 |
| WO | 2015063210 | 5/2015 |
| WO | 2015063211 | 5/2015 |

OTHER PUBLICATIONS

Feng et al., "A Class IV Flextensional Device Based on Electrostrictive Poly(vinylidene fluoride-trifluoroethylene," Jun. 2003, pp. 1-6.

Fons Ten Kroode et al., "Broadband seismic data—The importance of low frequencies," Geophysics, Mar.-Apr. 2013, pp. WA3-WA14, vol. 78, No. 2.

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, "PGS shows off electrical marine vibrator to capture 'alternative' seismic source market,"First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Ralph S.Woollett, "Current Approaches to the Miniaturization and Pressure Release Problems of VLF Transducers," Naval Underwater Systems Center, Nov. 5, 1973.

Ralph S. Woollett, "Underwater Helmholtz-Resonator Transducers: General Design Principles," NUSC Technical, Jul. 5, 1977.

International Search Report and Written Opinion for App. No. PCT/CA2015/051262 dated Feb. 15, 2016.

Hardee, H.C. et al: "Downhole Seismic Source", Geophysics, vol. 52, No. 6, Jun. 1987, pp. 729-739.

USPTO Non-Final Office Action for U.S. Appl. No. 14/942,470 dated Sep. 1, 2016.

USPTO Final Office Action for U.S. Appl. No. 14/942,470 dated Dec. 23, 2016.

(56) References Cited

OTHER PUBLICATIONS

USPTO Non-Final Office Action for U.S. Appl. No. 14/942,470 dated Aug. 25, 2017.
EP Search Report for Application No. 15865856.7 dated Nov. 14, 2018.
Brazilian Search Report with English Translation for Application No. BR112017011259-0 dated Apr. 29, 2020.

* cited by examiner

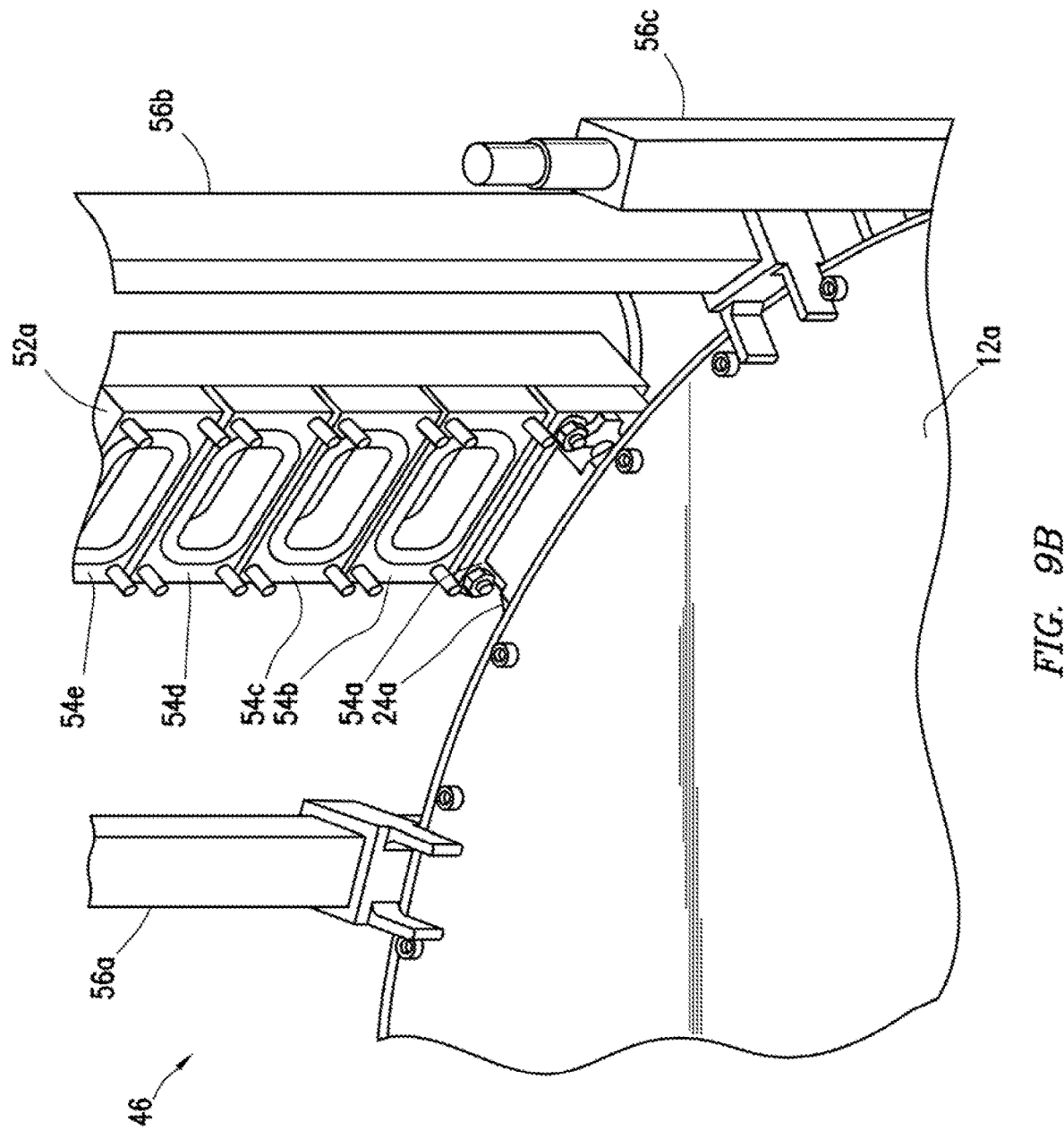

USE OF EXTERNAL DRIVER TO ENERGIZE A SEISMIC SOURCE

CROSS-REFERENCE TO RELATED APPLICATIONS

The present application is a continuation of U.S. patent application Ser. No. 14/942,470, filed Nov. 16, 2015, which claims priority to U.S. provisional application No. 62/086,601, filed Dec. 2, 2014, the disclosures of which are incorporated herein by reference.

BACKGROUND

Seismic sources are generally devices that generate acoustic energy. One use of seismic sources is in marine seismic surveying in which the seismic sources may be employed to generate acoustic energy that travels downwardly through water and into subsurface rock. After interacting with the subsurface rock, e.g., at boundaries between different subsurface layers, some of the acoustic energy may be returned toward the water surface and detected by specialized sensors (e.g., hydrophones, geophones, etc.). The detected energy may be used to infer certain properties of the subsurface rock, such as structure, mineral composition and fluid content, thereby providing information useful in the recovery of hydrocarbons.

Most of the seismic sources employed today in marine seismic surveying are of the impulsive type, in which efforts are made to generate as much energy as possible during as short a time span as possible. The most commonly used of these impulsive-type sources are air guns that typically utilize compressed air to generate acoustic energy. Other examples of impulsive-type sources include explosives and weight-drop impulse sources. The frequency content of these impulsive-type sound sources typically in use today is controllable only to a small degree. As a result, different sound sources may be selected for the generation of different frequency ranges based on the surveying needs. Notably, these impulsive-type sources also have limited acoustic energy output in the very low frequency band from 1-10 Hz. However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Thus, efforts have been undertaken to develop sound sources that can operate at low frequencies.

BRIEF DESCRIPTION OF THE DRAWINGS

These drawings illustrate certain aspects of some of the embodiments of the present invention and should not be used to limit or define the invention.

FIG. 9B illustrates a close-up view of the stack assembly of FIG. 9A.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to seismic sources for marine geophysical surveys. More particularly, embodiments relate to a seismic source that utilizes an external driver to energize the air in the seismic source for generation of acoustic energy.

Figure 1:
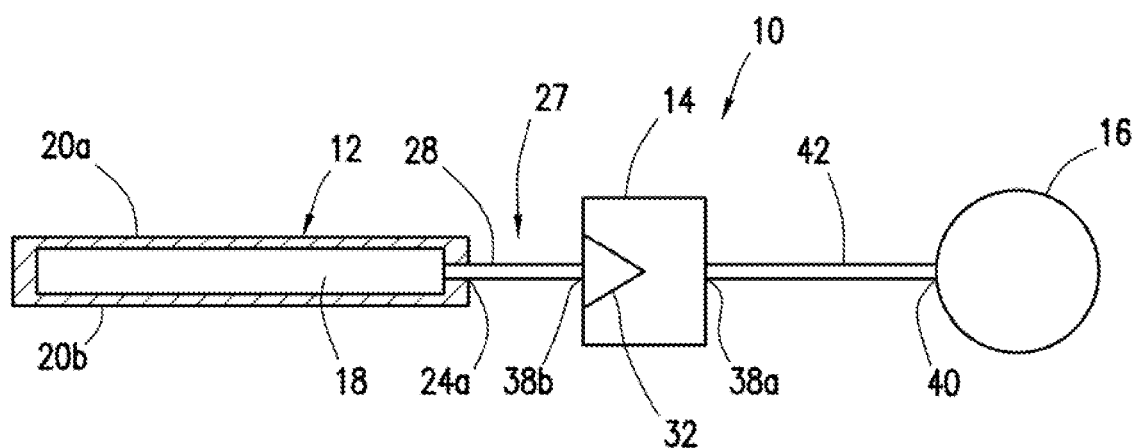
FIG. 1 illustrates an example apparatus in accordance with one embodiment.

FIG. 1 illustrates a non-limiting embodiment of apparatus 10. As illustrated, the apparatus 10 may comprise a seismic source 12, an external driver 14, and a fluid reservoir 16. The seismic source 12 may be coupled to the external driver 14. In some embodiments, the seismic source 12 may contain an internal cavity 18 that is coupled to the external driver 14. As a result of such coupling, the volume of fluid in the internal cavity 18 may be in fluid communication with the external driver 14. As illustrated, the external driver 14 may also be coupled to the fluid reservoir 16 such that the volume of fluid in the fluid reservoir 16 may be in fluid communication with the external driver. The fluid reservoir 16 may be configured to have a variable volume. In operation, actuation of the external driver 14 should generate a pressure wave that travels from the external driver 14 to the internal cavity 18 of the seismic source 12 to energize the fluid in the internal cavity 18 (as well as the fluid in the second conduit 42). In turn, energizing the fluid in the internal cavity should cause generation of acoustic energy, for example, by actuation of vibratory surfaces (e.g., base plates 20a, 20b). In addition, fluid may be resonated back and forth between the external driver 14 and the fluid reservoir 16. This resonating flow of fluid or "fluid resonance" may assist the external driver, for example, by increasing the vibration amplitude of the external driver 14 and in turn of the seismic source 12, as compared to no connection to a fluid reservoir 16. In particular embodiments, the fluid resonance may increase the acoustic output of the seismic source 12 by as much as 14 decibels or even more as compared to a similar seismic source without fluid resonance.

Figure 2A:
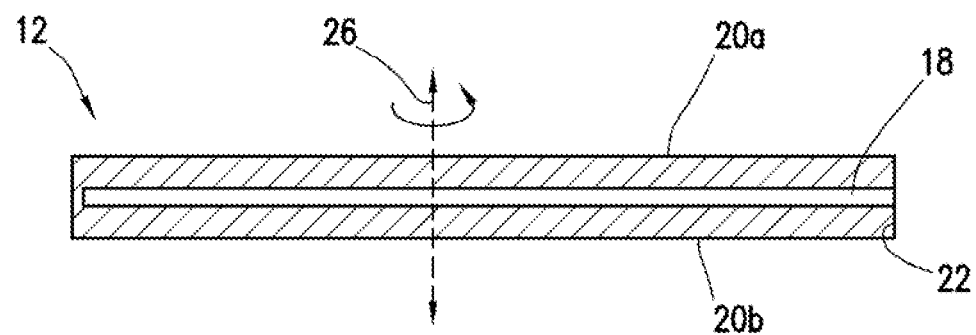
FIG. 2A illustrates a cross-sectional view of a seismic source according to one embodiment.

With additional reference to FIG. 2A, a cross-sectional view of a non-limiting embodiment of the seismic source 12 is illustrated. As illustrated, the seismic source 12 may be in the form of a mechanical device, such as a "bender" (also commonly referred to as a "flexural-disc projector"). In some embodiments, the seismic source 12 may include flexible waterproof material (not shown), such as plastic or rubber. In other embodiments, however, the flexible, waterproof material may be omitted from the seismic source 12. However, the disclosure is not limited to the seismic source 12 being a mechanic device, such as a bender. The seismic source 12 may include other types of acoustic vibratory sources, sound projectors, and other such devices.

In this particular embodiment, the seismic source 12 may include components, such as a pair of base plates 20a and 20b. While not illustrated, springs and mass elements may be attached to the base plates 20a and 20b as desired for a particular application. In some embodiments, the base plates 20a and 20b may be generally planar. In particular embodiments, the base plates 20a and 20b may each be in the form of a flexible disk. In embodiments, the base plates 20a and 20b may each be flat, circular disks having substantially uniform thickness. However, other configurations, including both axially-symmetric and not, of the base plates 20a and 20b may be suitable for particular applications. By way of example, the base plates 20a and 20b may be rectangular, square, elliptical, or other suitable shape for providing the desired acoustic energy. The base plates 20a and 20b may be made from any of a variety of materials including materials comprising steel, aluminum, a copper alloy, glass-fiber reinforced plastic (e.g., glass-fiber reinforced epoxy), carbon fiber reinforced or other suitable flexible spring material. Examples of suitable copper alloys may include brass, beryllium, copper, phosphor bronze, or other suitable copper alloy. In some embodiments, the base plates 20a and 20b may comprise aluminum. The base plates 20a and 20b may be made from the same or a different material. In particular embodiments, the base plates 20a and 20b may have a thickness from about 1 millimeter to about 12 millimeters or even greater. In general, the base plates 20a and 20b should have a thickness that allows sufficient deformation but withstand expected differential static pressures.

The base plates 20a and 20b may be secured together or otherwise positioned to provide the internal cavity 18 of the seismic source 12 between the base plates 20a and 20b. The base plates 20a and 20b may also be secured to one another in a manner that allows the base plates 20a and 20b to bend and create the desired acoustic energy. In particular embodiments, the base plates 20a and 20b may be coupled to another at their outer edges. In one non-limiting embodiment, the base plates 20a and 20b may be secured together by hoop 22, as illustrated on FIG. 2A. With additional reference to FIG. 2B, the hoop 22 may be secured to the base plates 20a and 20b in any suitable manner, including by use of bolts 23, for example. The internal cavity 18 may be bounded by the pair of base plates 20a and 20b and held in place by the hoop 22 that may be included in the seismic source 12. The hoop 22 may be configured to maintain a separation (e.g., a gap) between the pair of base plates 20a and 20b and facilitate a movement of the seismic source 12. For example, when the air in the internal cavity 18 is energized by the external driver 14 (as well as the air in the second conduit 42 shown on FIG. 1), the base plates 20a and 20b may flex and bend to generate acoustic energy.

Figure 2B:
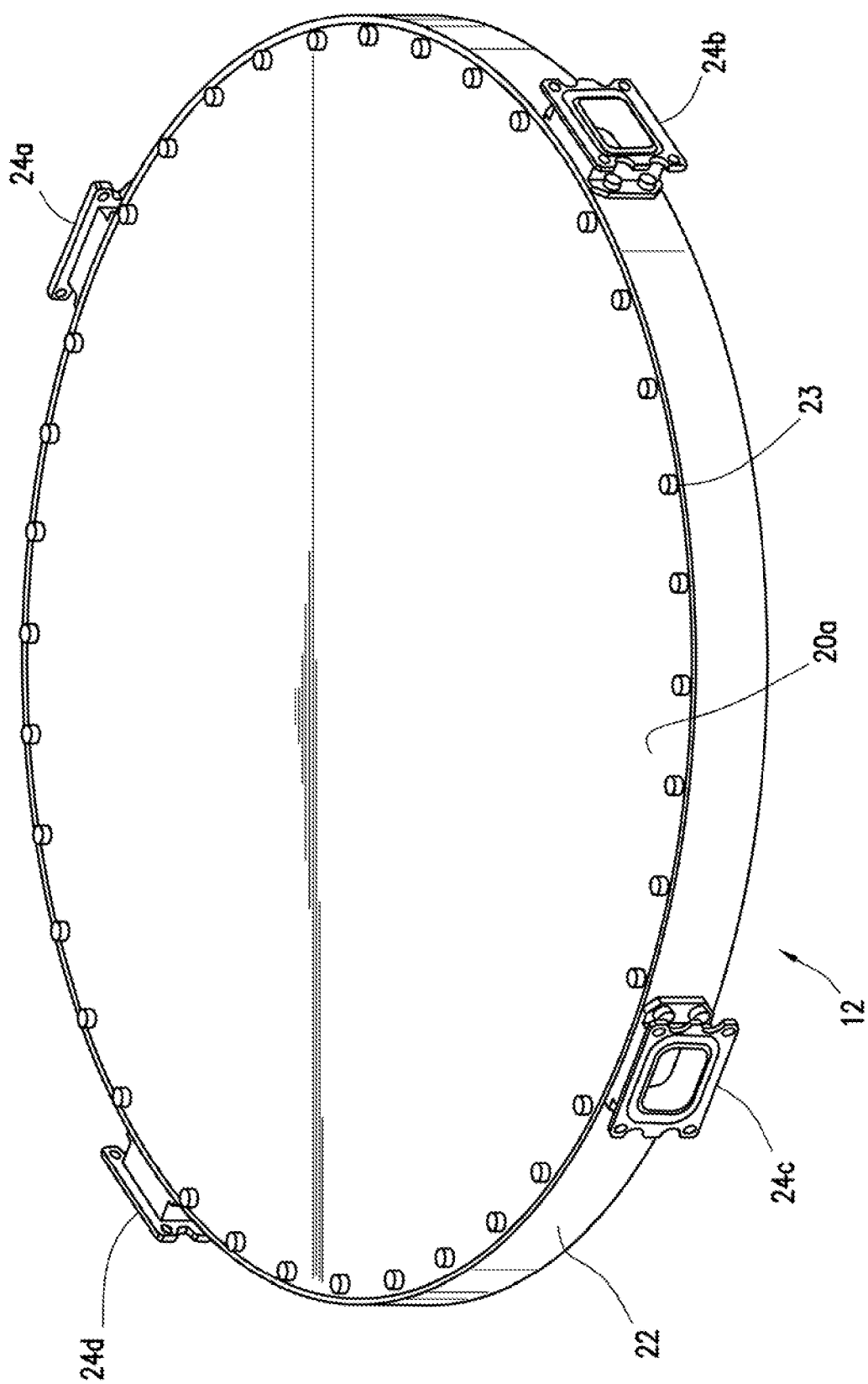
FIG. 2B illustrates a top view of a seismic source according to one embodiment.

The internal cavity 18 may also include ports, such as 24a, 24b, 24c, and 24d illustrated in FIG. 2B. These ports 24a, 24b, 24c, and 24d may serve as apertures for transporting fluid to and from the internal cavity 18. Each of the ports 24a, 24b, 24c, and 24d may be configured to facilitate fluid flow between the internal cavity 18 and the external driver 14. In one non-limiting embodiment, ports 24a, 24b, 24c, and 24d may be connected to each other which may then be connected to the external driver 14.

The internal cavity 18 may be configured to hold a volume of a fluid, which may be a gas, such as air or another compressible fluid or gaseous substance. The volume of fluid within the internal cavity 18 may be dependent on the volume of the internal cavity 18, which in turn would depend on the dimensions of the internal cavity 18 (e.g., diameter, length, height, etc.). The volume of fluid contained within the internal cavity 18 may serve, among other purposes, as a compliant medium to reduce any impedance to the vibration amplitude of the base plates 20a and 20b. In some embodiments, the entire volume of the internal cavity 18 may not be filled with the fluid. For example, other fluids such as oils, alcohols, water/glycol mixtures, etc., may be used in the internal cavity 18. In some embodiments, the volume of fluid within the internal cavity 18 may be pressurized. In marine applications, for example, pressuring and maintaining the volume of fluid within the internal cavity 18 at an ambient hydrostatic pressure at an operating water depth may protect the seismic source 12 from collapsing from ambient hydrostatic pressure.

In the embodiment illustrated in FIGS. 1, 2A, and 2B, the fluid within the internal cavity 18 of the seismic source 12 may be in communication with the external driver 14. When the external driver 14 is actuated, the external driver 14 may generate a pressure wave that energizes the fluid in the internal cavity 18, second conduit 42, thus causing the base plates 20a and 20b to bend, flex, or otherwise be deformed, resulting in vibration and acoustic output. In this embodiment, the base plates 20a and 20b may bend, flex, or otherwise be deformed axially along axis of symmetry 26 illustrated on FIG. 2A. In non-limiting embodiments, the external driver 14 may generate a pressure wave in the fluid that travels from the external driver 14 to the internal cavity 18 of the seismic source 12. In the illustrated embodiment, the apparatus 10 may use a fluid resonance to increase the pressure wave imparted by the external driver 14. In some embodiments, fluid may be resonated back and forth between the external driver 14 and the fluid reservoir 16. The fluid resonance may increase the acoustic output of the external driver 14 and in turn of the seismic source 12, as compared to no connection to a fluid reservoir 16.

Referring now to FIG. 1, embodiments of the apparatus 10 include an external driver 14. As illustrated in FIG. 1, the external driver 14 may be disposed external to the seismic source 12. As illustrated, the external driver 14 and the seismic source 12 may be coupled via conduit system 27. The conduit system 27 may include first conduit 28 that couples the external driver 14 and the seismic source 12. As a result of such coupling, the volume of fluid within the internal cavity 18 may be in fluid communication with the external driver 14.

Figure 3:
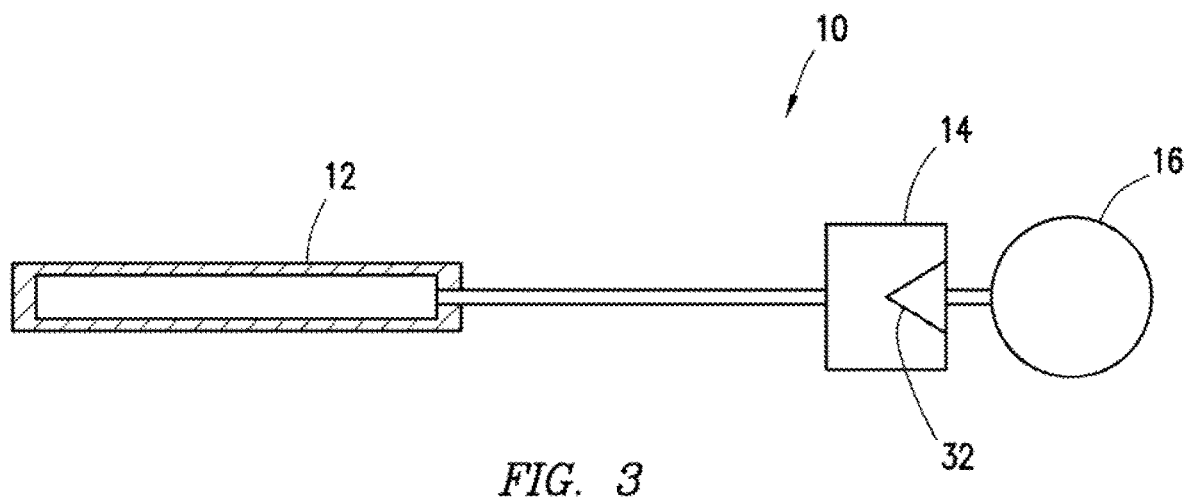
FIG. 3 illustrates an example apparatus in accordance with another embodiment.
Figure 4:
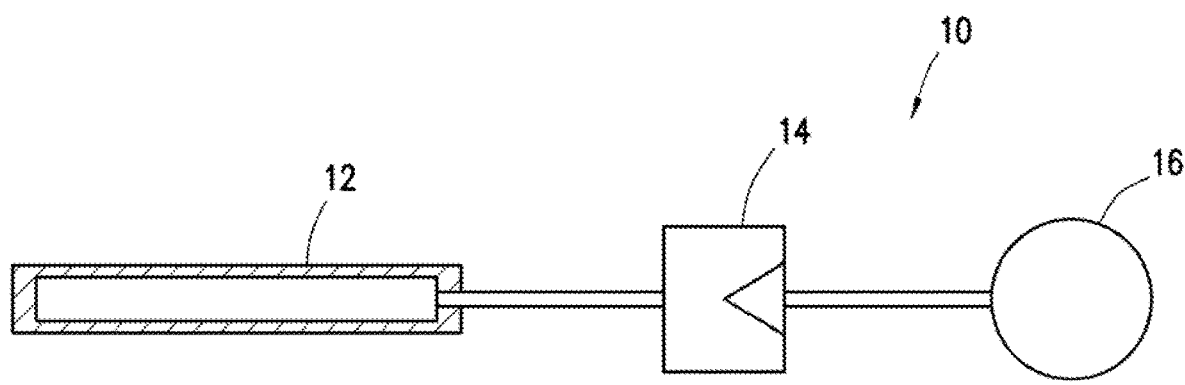
FIG. 4 illustrates an example apparatus in accordance with another embodiment.

In the embodiment illustrated in FIG. 1, the external driver 14 may be positioned between the seismic source 12 and the fluid reservoir 16. As illustrated in FIG. 1, the external driver 14 may be positioned closer to the seismic source 12 than to the fluid reservoir 16. However, other arrangements of the external driver 14 may be used in accordance with embodiments of the present invention. For example, the external driver 14 may be positioned at any suitable location between the seismic source 12 and the fluid reservoir 16. In the embodiment illustrated in FIG. 3, the apparatus 10 is shown with the external driver 14 positioned closer to the fluid reservoir 16 than to the seismic source 12. As illustrated in FIG. 4, another embodiment may include the external driver 14 positioned equidistant between the seismic source 12 and the fluid reservoir 16. The apparatus 10 of FIGS. 3 and 4 may still use fluid resonance for increasing acoustic output, but the locations of the resonance may vary based on the respective lengths of first conduit 28 and second conduit 42.

Figure 5:
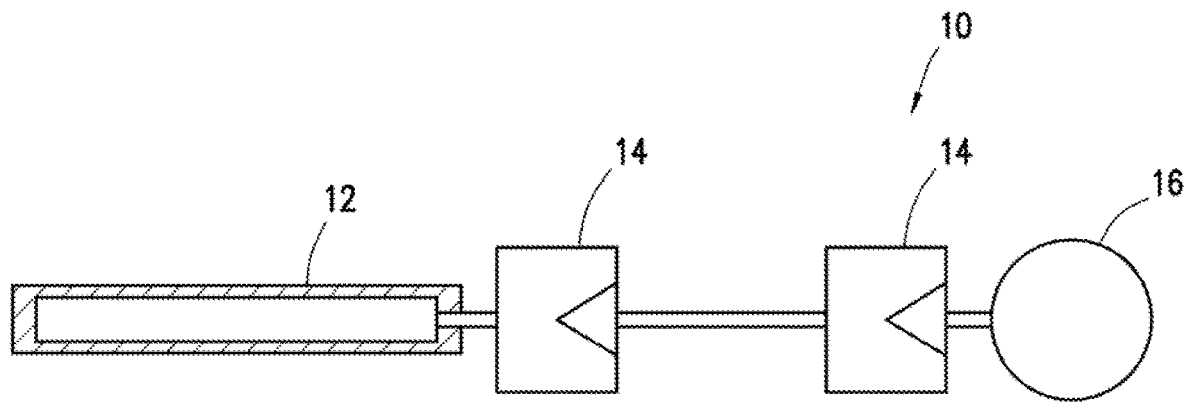
FIG. 5 illustrates an example apparatus in accordance with yet another embodiment.

In addition, more than one external driver 14 may be used and arranged in series or in parallel. By way of example, FIG. 5 illustrates a pair of external drivers 14 positioned in series between the seismic source 12 and the fluid reservoir 16 with one of the external driver's 14 positioned closer to the seismic source 12 and the other of the external driver's positioned closer to the fluid reservoir 16.

The external driver 14 may be any suitable driver for generation of a pressure wave that energizes the fluid in the internal cavity 18 of the seismic source 12. In some embodiments, the external driver 14 may be an electroacoustic transducer for generation of acoustic energy. In non-limiting embodiments, the electroacoustic transducer may generate force by vibrating a portion of its surface. In other embodiments, the external driver 14 may be linear motor, such as a linear motor, which may be a linear magnetic motor that may be energized electrically. A suitable linear motor may include stationary electric coils and a magnetic component (e.g., a magnetic cylinder) that passes through a magnetic field generated by the stationary electric coils, or vice versa. An example embodiment with a linear motor is described in more detail below with respect to FIGS. 12A and 12B.

Figure 7:
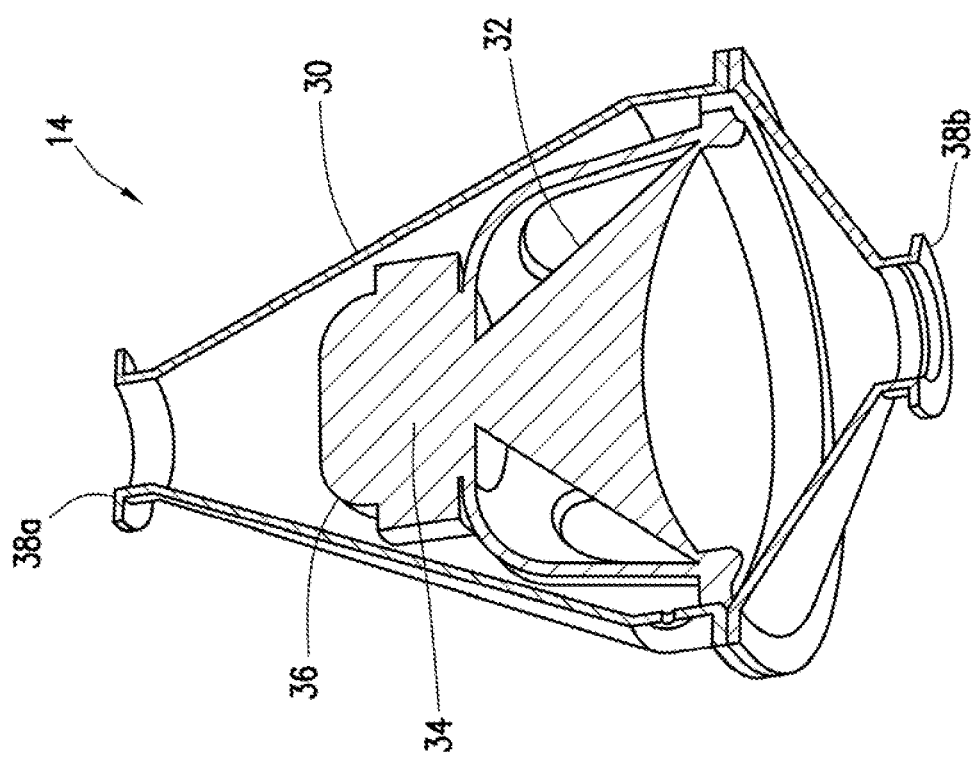
FIG. 7 illustrates a cross-sectional view of an example subwoofer that may be used in apparatus of the present disclosure in accordance with one embodiment.
Figure 6:
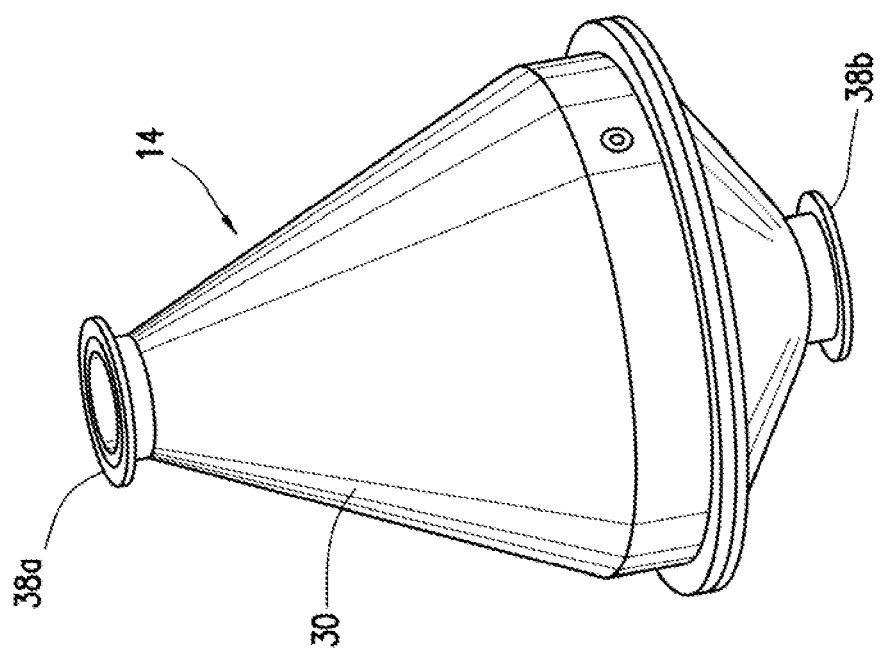
FIG. 6 illustrates an example subwoofer that may be used in apparatus of the present disclosure in accordance with one embodiment.

With additional reference to FIGS. 6 and 7, a non-limiting embodiment of an external driver 14 is illustrated. As shown, the external driver 14 may be in the form of a loudspeaker, such as a moving coil electrodynamic loudspeaker. In particular embodiments, the loudspeaker may be a subwoofer to, for example, produce acoustic energy at 100 Hz or less and, alternatively, at 10 Hz or less. However, the disclosure is not limited to the external driver 14 being a loudspeaker or subwoofer.

In the embodiment illustrated in FIGS. 6 and 7, the external driver 14 may comprise a housing 30 enclosing a diaphragm 32, a voice coil 34, and a magnet 36. As illustrated, the voice coil 34 may be installed between the poles of the magnet 36 such that, when a signal is applied to the voice coil 34, the voice coil 34 may move back and forth, which in turn causes the diaphragm 32 attached to the voice coil 34 to move back and forth, energizing the fluid in the system, for example, in fluid reservoir 16, second conduit 42, and internal cavity 18. In the illustrated embodiment, the diaphragm 32 may have a taper. With additional reference to FIG. 1, the diaphragm 32 may taper toward the fluid reservoir 16. However, the disclosure is not limited to the diaphragm 32 tapering in this direction and, as illustrated on FIG. 3, the diaphragm 32 may also taper toward the seismic source 12. The housing 30 of the external driver 14 may further include ports 38a and 38b on either end that allow air to communicate between the seismic source 12 and the external driver 14 and/or between the fluid reservoir 16 and the external driver 14.

In the embodiment illustrated in FIG. 1, first conduit 28 may be coupled between the external driver 14 and the seismic source 12. One end of the first conduit 28 may be coupled to the internal cavity 18 of the seismic source 12. For example, one end of the first conduit 28 may be coupled to port 24a illustrated on FIG. 1. The other end of first conduit 28 may be coupled to the external driver 14, for example, to port 38b.

Referring now to FIG. 1, embodiments of the apparatus 10 includes fluid reservoir 16. In the non-limiting embodiment illustrated in FIG. 1, the fluid reservoir 16 may be disposed external to the seismic source 12 with the external driver 14 coupled between the fluid reservoir 16 and the seismic source 12. Fluid reservoir 16 may include a cavity or container which may be made from a material such as, without limitation, metal, alloy, or polymer. Fluid reservoir 16 may be configured to contain a volume of a fluid, such as air or another compressible fluid or gaseous substance. The volume of fluid contained in the fluid reservoir 16 may be the same or different value than the volume of fluid within the internal cavity 18 of the seismic source 12. The volume of fluid would depend on a volume of the fluid reservoir 16, which in turn would be based on dimensions of the fluid reservoir 16 (e.g., diameter, length, height, etc.).

In the embodiment illustrated on FIG. 1, the fluid reservoir 16 may include aperture 40. Yet in other embodiments, the fluid reservoir 16 may include more than one aperture 40 (not shown). The aperture 40 may or may not include a valve or other device that may regulate, direct, or control the flow of fluid to and from the fluid reservoir 16. In the embodiments, in which the fluid reservoir 16 may include more than one aperture 40, any number of valves may be included, or valves may be omitted entirely.

In the non-limiting embodiment illustrated in FIG. 1, the fluid reservoir 16 and the external driver 14 may be coupled via second conduit 42, for example, to permit a fluid resonance therebetween. As a result of such coupling, the volume of fluid within the fluid reservoir 16 may be in fluid communication with the external driver 14. In non-limiting embodiments, a fluid resonance may accordingly pass between the external driver 14 and the fluid reservoir 16. In the embodiment illustrated in FIG. 1, the second conduit 42 may be coupled between the external driver 14 and the fluid reservoir 16. One end of the second conduit 42 may be coupled to the external driver 14. For example, one end of the second conduit 42 may be coupled to port 38a illustrated on FIG. 1. The other end of second conduit 42 may be coupled to the fluid reservoir 16, for example, to aperture 40.

With continued reference to FIG. 1, the apparatus 10 may include a conduit system 27. As illustrated, the conduit system 27 may include a first conduit 28 and a second conduit 42. The first conduit 28 and second conduit 42 may each individually be one or more hoses, pipes, or other suitable device. In some embodiments, the first conduit 28 and second conduit 42 may have a generally circular cross-sectional area that may be defined by a diameter, while in other embodiments, the cross-sectional area may be defined by any other suitable geometry. A volume of the first conduit 28 and a volume the second conduit 42 may each individually depend on dimensions of the respective first conduit 28 and second conduit 42. More than one first conduit 28 and more than one second conduit 42 may be included in the apparatus 10. For example, a plurality of the first conduit 28 may include a plurality of conduits arranged in an array and/or the second conduit 42 may include a plurality of conduits 42 arranged in an array. The seismic source 12 and the external driver 14 and/or the external driver 14 and the fluid reservoir 16 may be coupled via such array. For example, FIG. 8 (to be discussed in more detail in other portions of the specification) shows an embodiment in which first conduit 28 includes an array of four manifold conduits 44a, 44b, 44c, 44d that joint into conduit segment 45. In some embodiments, a hole or opening in the external driver 14 may permit limited communication between the first conduit 28 and the second conduit 42, for example, to prevent or limit a static pressure difference across the external driver 14. By way of example, a small hole may be formed in diaphragm 32 (e.g., FIG. 7) to permit communication between the first conduit 28 and the second conduit 42. It In some embodiments, this hole, where used, may be sufficiently small so that it may not significantly reduce the dynamic pressure generated by the external driver 14 at the drive frequencies (1 Hz and up), but may equalize the static pressure so long as the static pressure varies slowly, e.g., over many seconds.

As discussed earlier, the apparatus 10 may include an external driver 14. In some embodiments, the apparatus 10 may include fluid resonance, for example, a resonating flow of fluid back and forth between the external driver 14 and the fluid reservoir 16. The fluid may resonate, for example, in response to an input of energy (e.g., applying a current to the voice coil 34 on FIG. 7). That is, the volume of fluid may be resonated within the apparatus 10 by the energy imparted to the volume of fluid based on the vibration of the external driver 14. In one non-limiting embodiment, because the external driver 14 and the fluid reservoir 16 may be coupled, when the external driver 14 actuates, a fluid resonance may pass between the external driver 14 and the fluid reservoir 16. In the embodiment in which the external driver 14 and the fluid reservoir 16 may be coupled by the second conduit 42, a fluid resonance may accordingly pass between the external driver 14 and the fluid reservoir 16 by way of the second conduit 42. In this and other embodiments, a resonance frequency (or resonance) of the resonating volume within the apparatus 10 may be dependent on factors including dimensions (e.g., diameter and/or length) of the second conduit 42.

Specifically, when the external driver 14 includes a loudspeaker, the external driver 14 may include a voice coil 34, as illustrated on FIG. 7. Upon the voice coil 34 receiving a signal, the voice coil 34 may move back and forth causing the diaphragm 32 to move back and forth, generating acoustic energy. This movement may cause fluid to resonate between the external driver 14 and the fluid reservoir 16. When the external driver 14 is driven at the resonance frequency of the volume of fluid flowing between the external driver 14 and the fluid reservoir 16, the dynamic pressure within the external driver 14 may peak. The resonance frequency of the volume of fluid may be determined based on dimensions such as a length and a cross-sectional area of second conduit 42. The resonance frequency of the volume of fluid resonating between the external driver 14 and the fluid reservoir 16 may also be affected by other parameters. Such other parameters may include a volume of fluid reservoir 16, a length, cross-sectional area and/or quantity of other components in the flow path of the volume of fluid (e.g., port 38a) and ambient pressure. A suitable choice of these aforementioned parameters may cause external driver 14 to generate acoustic energy at a particular frequency range (e.g., below 10 Hz) and, in turn, cause the seismic source 12 to operate at a particular frequency range. The particular frequency range would in turn determine a range of corresponding advantageous water depths for operating seismic source 12. For example, when the seismic source 12 may be operating at a frequency of 5 Hz, the wavelength of the acoustic wave may be approximately 300 meters (e.g., based on a velocity in water of approximately 1,500 m/s) and the advantageous operating depth therefore may be approximately wavelength/4 or approximately 75 meters.

The fluid resonance may be adjusted by adjusting at least one dimension of the conduit system 27. Because a fluid resonance of the volume flowing between the external driver 14 and the fluid reservoir 16 may be approximate as proportional to the square root of the cross-sectional area of the second conduit 42 divided by the length of the second conduit 42, given a particular change in a cross-sectional area and/or a length of the second conduit 42, a corresponding change in the resonance of the volume of fluid within the second conduit 42 may be approximated or determined. In non-limiting embodiments, a resonance frequency of the fluid resonating between the fluid reservoir 16 and the external driver 14 may be adjustable or tunable based on adjusting or varying (e.g., a cross-sectional area, a length, etc.) of the second conduit 42. Second conduit 42 may include at least one dimension that is adjustable to change, adjust, or tune a resonance frequency. In one embodiment, the dimension that is adjustable may be the length of the second conduit 42. In other embodiments, the dimension that is adjustable or tunable may include a width, a diameter, a cross-sectional area or other dimension of the second conduit 42, or combinations of any of these dimensions. While illustrated, the portion of the second conduit 42 that is adjustable may be disposed in the fluid reservoir 16. Alternatively, when the fluid resonance may be between the seismic source 12 and the external driver 14 at least one dimension of the first conduit 28 may be adjusted.

Figure 8:
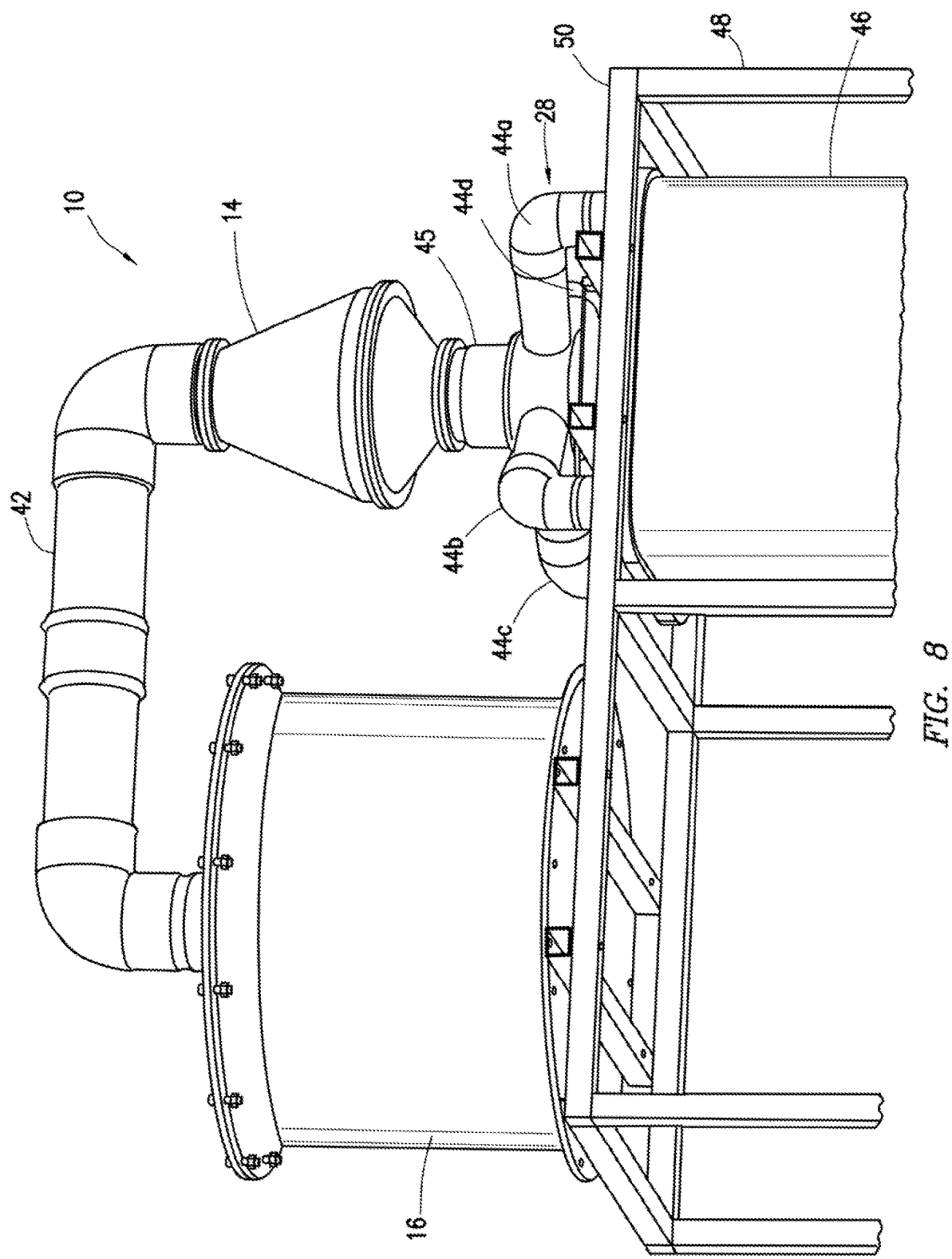
FIG. 8 illustrates an apparatus in accordance with yet another embodiment.

Referring now to FIG. 8, apparatus 10 is shown in accordance with another embodiment of the present invention. As illustrated, the apparatus 10 may include stack assembly 46, an external driver 14, and a fluid reservoir 16. The stack assembly 46 may be coupled to the external driver 14 to permit fluid flow between the external driver 14 and the fluid reservoir 16. With additional reference to FIG. 9A, the stack assembly 46 may comprise a plurality of seismic sources 12a-12h arranged in stack, for example. In operation, actuation of the external driver 14 may generate a pressure wave that energizes fluid within the seismic sources 12a-12h in turn causing generation of acoustic energy. The stack assembly 46 may be coupled to the fluid reservoir 16 with the external driver 14 disposed therebetweeen. In embodiments, the external driver 14 may be coupled to the fluid reservoir 16 to permit fluid resonance to pass between the external driver 14 and the fluid reservoir 16. As previously described, the fluid resonance may increase the acoustic output of the external driver 14 and in turn of the seismic sources 12a-12h.

Apparatus 10 may further comprise support structure 48 for stack assembly 46, fluid reservoir 16, and external driver 14. Support structure 48 may be in form of a frame as illustrated or any other suitable device for supporting the components of the apparatus 10. In the illustrated embodiment, stack assembly 46 may be disposed below upper portion 50 of the support structure 48, whereas the fluid reservoir 16 and the external driver 14 may be disposed above the upper portion 50. However, the stack assembly, 46, fluid reservoir 16, and the external driver 14 may be positioned at different positions with respect to the support structure 48.

In this non-limiting embodiment, first conduit 28 may couple the external driver 14 to the stack assembly 46. First conduit 28 may be in a general vertical configuration, as illustrated. In the illustrated embodiment, first conduit 28 may comprise manifold conduits 44a, 44b, 44c, and 44d, which may be coupled to each of manifolds 52a, 52b, 52c, and 52d, as illustrated on FIG. 9A, of stack assembly 46, respectively. As illustrated, first conduit 28 may further comprise conduit segment 45 coupled to manifold conduits 44a, 44b, 44c, and 44d. In the illustrated embodiment, second conduit 42 may couple the external driver 14 to the fluid reservoir 16.

Figure 9A:
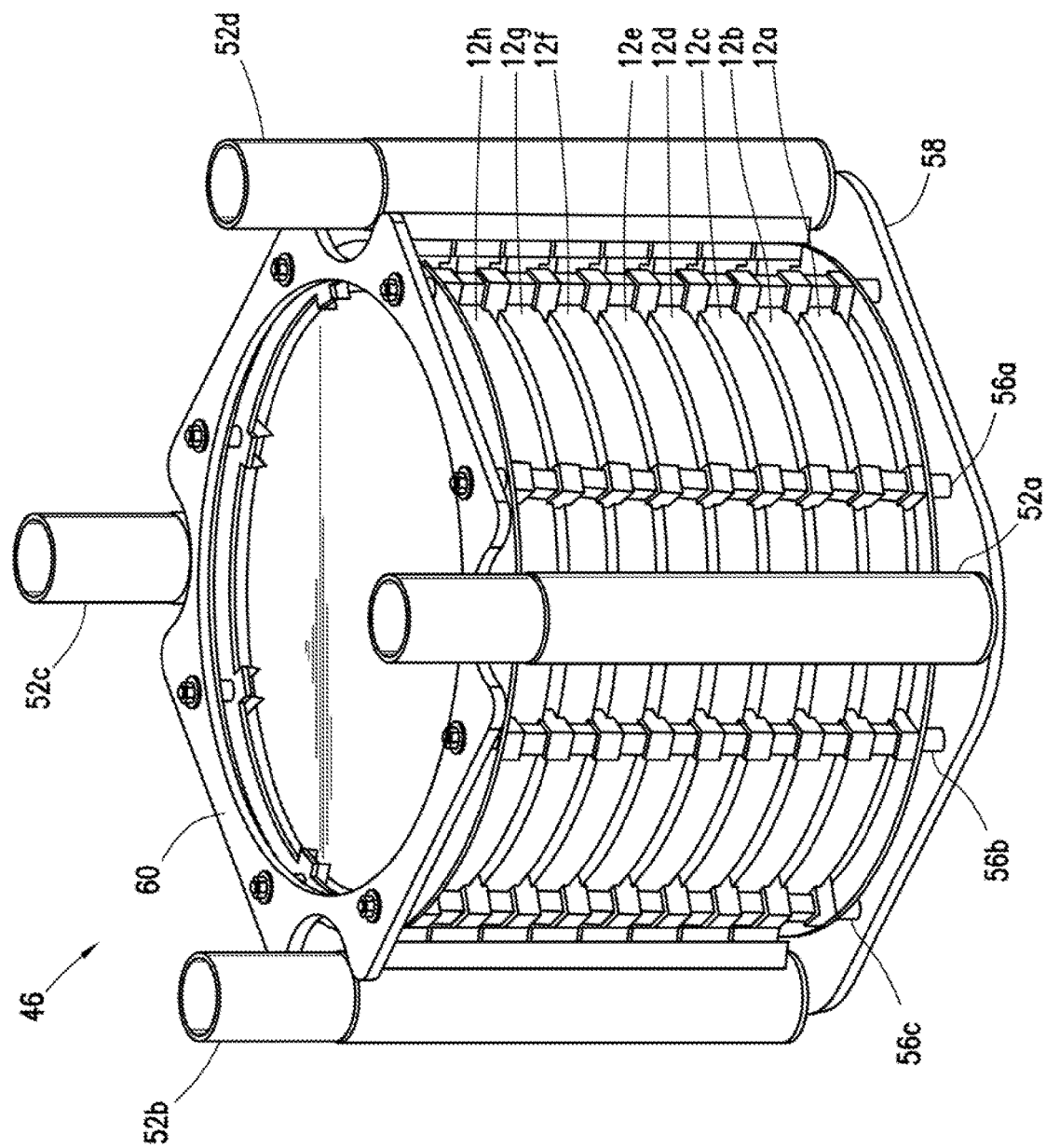
FIG. 9A illustrates a stack assembly of seismic sources in accordance with one embodiment.

Referring now to FIG. 9A, a partial assembly of an embodiment in which seismic sources 12a-12h may be arranged in stack assembly 46. In one embodiment, the stack assembly 46 may comprise the seismic sources 12a-12h in a series configuration. Stack assembly 46 may comprise four manifolds 52a, 52b, 52c, and 52d. The manifolds 52a, 52b, 52c, and 52d may each include a hose, pipe, or other similar component. In one particular embodiment each of the manifolds 52a, 52b, 52c, and 52d may be a pipe or hose segment with about a three-inch diameter, although other diameters are possible and contemplated. Each of the manifolds 52a, 52b, 52c, and 52d may be couple to each of the ports (e.g., ports 24a-24d of seismic source 12 on FIG. 2b) of the seismic sources 12a-12h. Each of the manifolds 52a, 52b, 52c, 52d may be coupled to the seismic sources 12a-12h.

FIG. 9B illustrates a close-up view of a portion of manifold 52a, which may include in one embodiment eight port connectors (of which five port connectors 54a-54e are shown). In the illustrated embodiment, port connector 54a may be coupled to port 24a of seismic source 12a. For illustrative purposes, seismic sources 12b-12h are not shown on FIG. 9B. In the embodiment illustrated in FIGS. 9A and 9B, the stack assembly 46 may include stack support structures, such as 56a, 56b, and 56c, which may hold the marine seismic sources 12a-12h in place within the stack assembly 46.

The embodiment illustrated in FIG. 9A also shows that the stack assembly 46 may include a bottom plate 58 and top plate 60 to which the seismic sources 12a-12h may be secured. The seismic sources 12a-12h may be disposed on top of the bottom plate 58 and below the top plate 60 to form a stack configuration of seismic sources 12a-12h. The seismic sources 12a-12h may be disposed such that they are aligned with the stack assembly 46. The stack configuration may be secured to the bottom plate 58 and the top plate 60.

Figure 10:
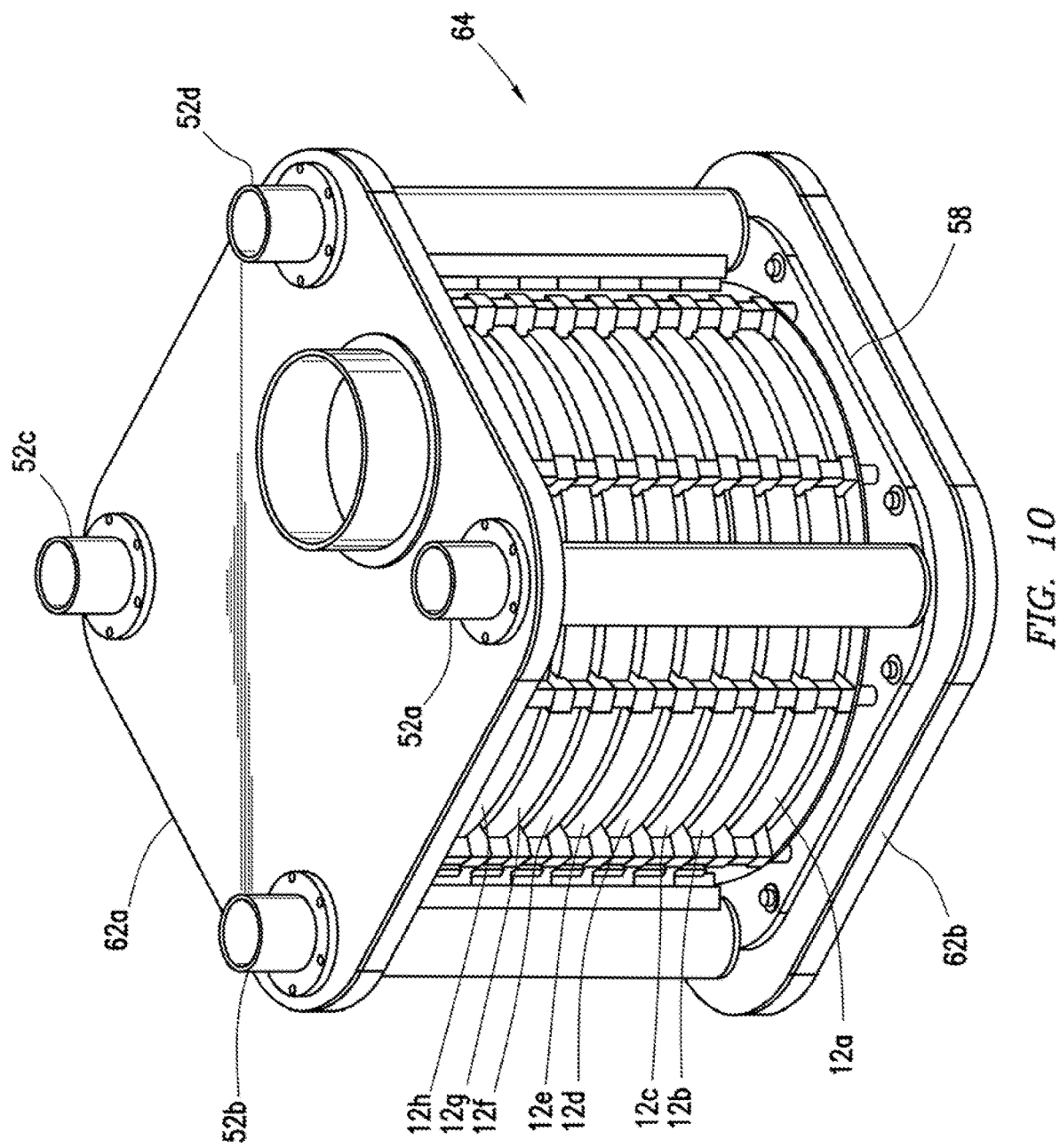
FIG. 10 illustrates a stack assembly of seismic source that includes components additional to the stack assembly of FIG. 9A in accordance with another embodiment.

FIG. 10 illustrates an embodiment of the stack assembly 46. As illustrated, the stack assembly 46 may further comprise endplates 62a and 62b. Endplates 62a and 62b may enclose seismic sources 12a-12h with top plate 60 (not in view) and bottom plate 58. As illustrated, manifolds 52a-52d may extend through endplate 62a.

Figure 11:
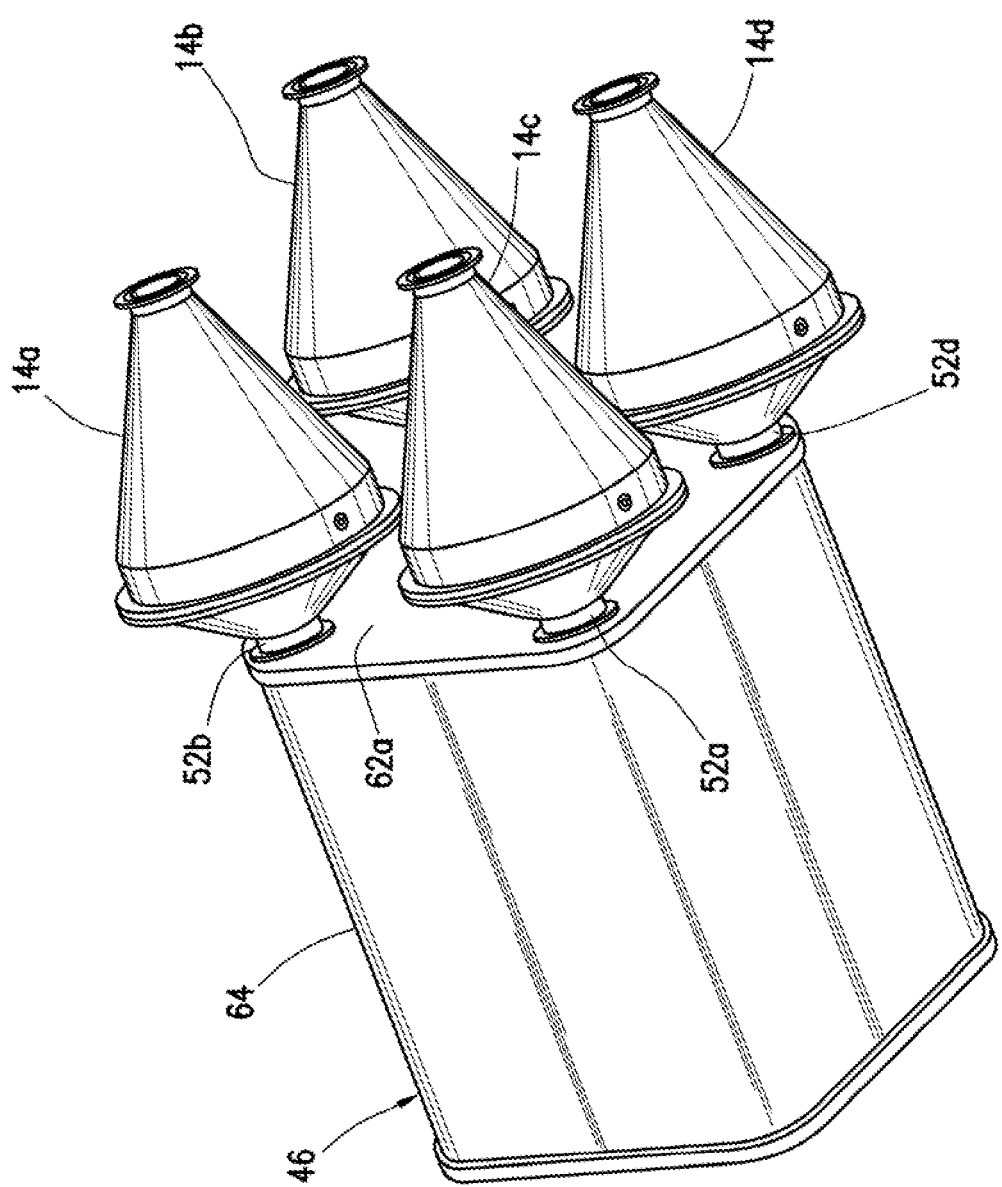
FIG. 11 illustrates a stack assembly of seismic source that includes components additional to the stack assembly of FIG. 9A in accordance with another embodiment.

FIG. 11 illustrates an embodiment of the stack assembly 46 which is coupled to a plurality of external drivers 14a, 14b, 14c, and 14d. In this non-limiting embodiment, the stack assembly 46 may comprise a housing 64 in which the stack of seismic source 12a-12h (not in view) are disposed. Housing 64 is optional and may be not used, in some embodiments, for example, where fill fluid may not be needed. As illustrated, the manifolds 52a-52d (of which manifold 52c is not in view) may extend through the endplate 62a of the stack assembly 46. In some embodiments, the external drivers 14a-14d may be arranged in parallel by, for example, being coupled to the manifolds 52a-52d in a parallel configuration, although other configurations that use a plurality of external drivers 14a-14d may be used, including a series configuration. Additionally, while FIG. 11 illustrates the use of four external driver's 52a-52b, the present invention contemplates the use of one or more external driver's with the stack assembly 46. While not illustrated, the external drivers 14a-14d may also be coupled to a fluid reservoir 16 as described herein.

Figure 12A:
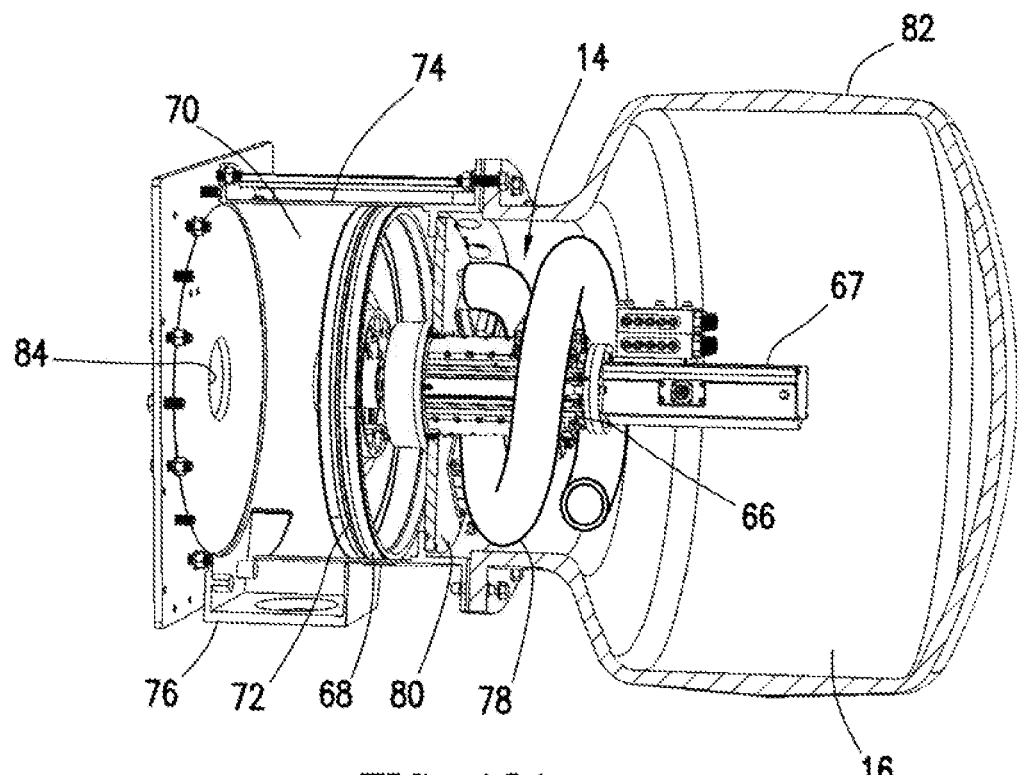
FIGS. 12A and 12B illustrate an example linear motor that may be used in apparatus of the present disclosure in accordance with example embodiments.
Figure 12B:
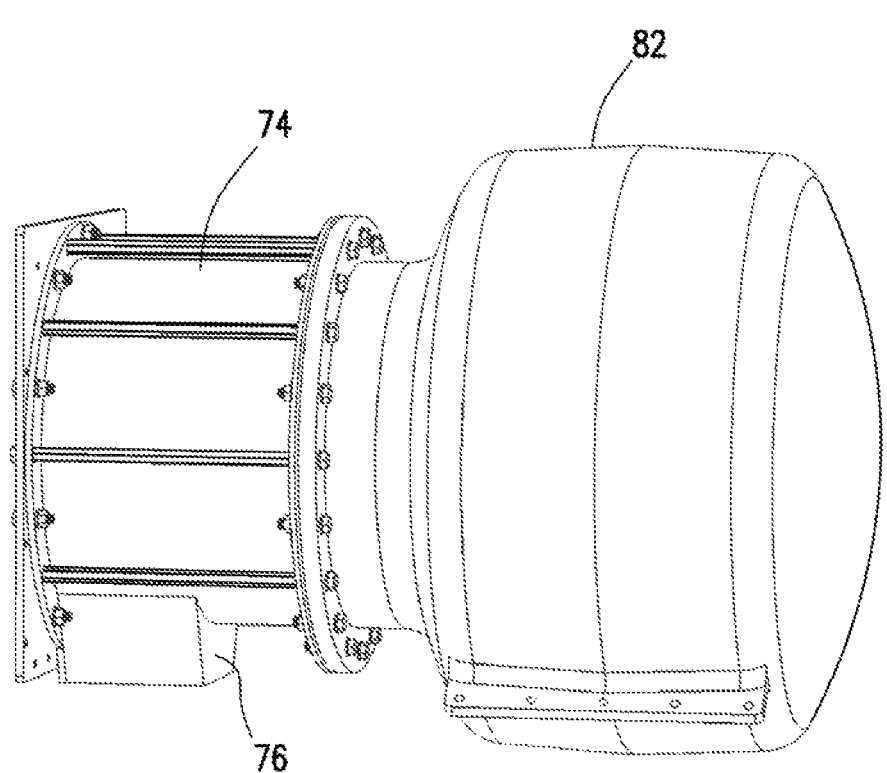

Referring now to FIGS. 12A and 12B, additional embodiments of external driver 14 are illustrated in more detail in which the external driver 14 comprises a linear motor 66. In the illustration of FIG. 12B, the external driver 14 is obstructed from view as it is disposed in chamber housing 74 and reservoir housing 82. In the illustrated embodiment, the linear motor 66 is coupled to a piston 68. Linear motor 66 may operable to translate piston 68 in chamber 70. External driver 14 may further comprise a linear position encoder 67 for encoding position of linear motor 66. A seal 72 (e.g., Teflon™ seal) may be formed between piston 68 and chamber housing 74, which may be in the form of a steel sleeve, for example. Chamber housing 74 may contain an outlet 76 which may be coupled to seismic source 12, for example, by first conduit 28. Seismic source 12 and first conduit 28 are illustrated on FIG. 1. In some embodiments, a resonance pipe 78 may be disposed on the opposite side of piston 68 from chamber 70. In particular embodiments, resonance pipe 78 may fluidically couple chamber 70 with fluid reservoir 16. As previously described, operation of external driver 14 may generate a fluid resonance, for example, with a resonating flow of fluid between fluid reservoir and piston 68 by way of resonance pipe 78. In the illustrated embodiment, resonance pipe 78 may be coupled to motor mount 80 of linear motor 66. As best seen on FIG. 12A, linear motor 66 may be disposed in fluid reservoir 16. In the illustrated embodiment, second conduit 42 (e.g., shown on FIG. 1) has been omitted as fluid reservoir 16 and external driver have been integrated. As illustrated, both the linear motor 66 and the fluid reservoir 16 may be disposed in a reservoir housing 82, which may be coupled to chamber housing 74. Embodiments may further include a pressure relief device 84, which may be in the form of a pressure safety disc, burst disc, or other suitable device for protecting external driver 14 from over-pressurization. As illustrated, pressure relief device 84 may be disposed in an end of chamber housing 74.

Figure 13:
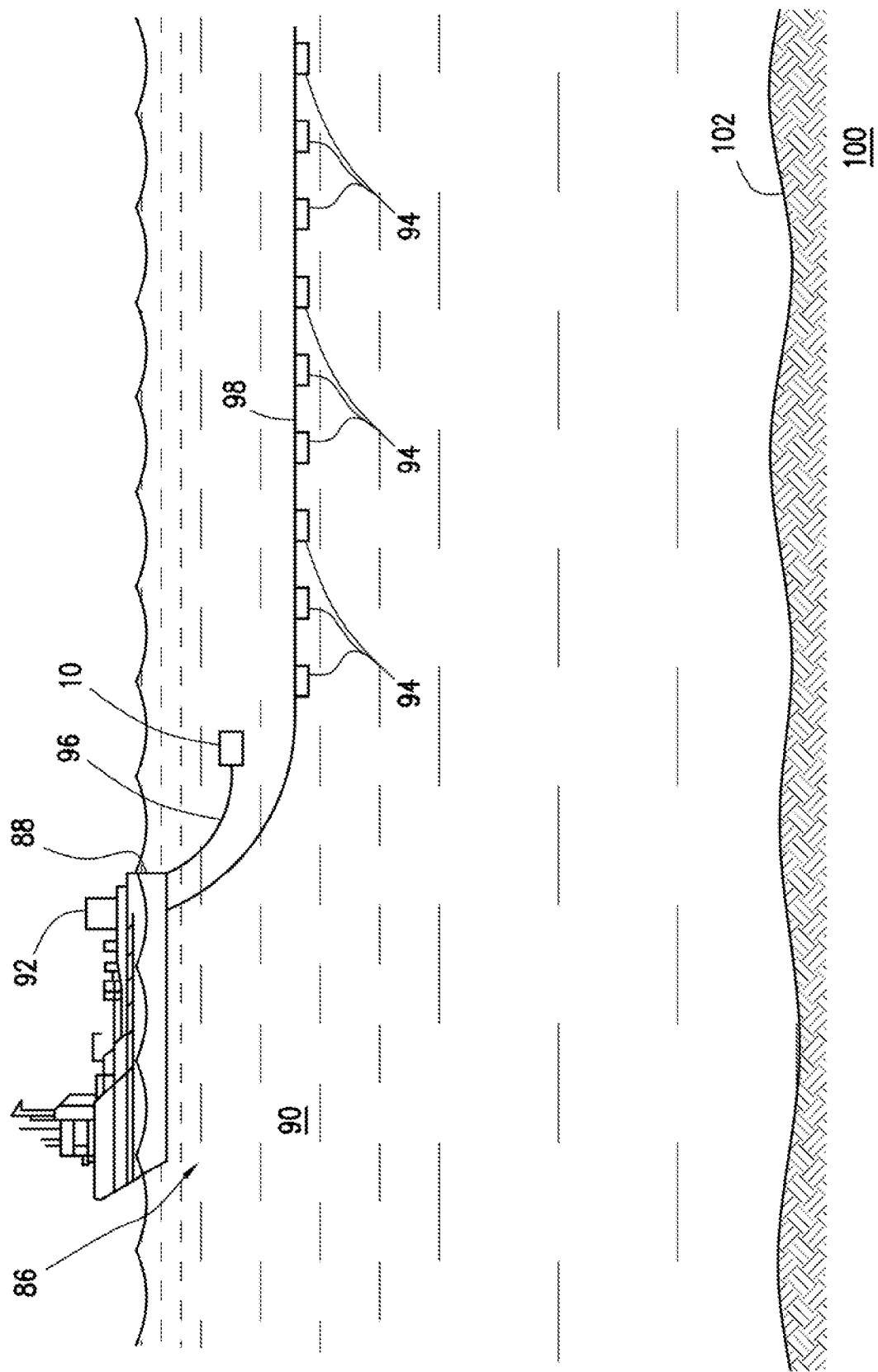
FIG. 13 illustrates an example marine survey system using an apparatus in accordance with one embodiment.

FIG. 13 illustrates an example technique for acquiring marine seismic data that can be used with embodiments of the present techniques. In this non-limiting embodiment, a marine survey system 86 comprises a survey vessel 88 that moves along the surface of a body of water 90, such as a lake or ocean. The survey vessel 88 may include thereon equipment, collectively referred to herein as a "recording system." The recording system 92 may include devices (none shown separately) for detecting and making a time indexed record of signals generated by each of seismic sensors 94 (explained further below), and for actuating a seismic source 12 (not in site) on apparatus 10. The recording system 92 may also include devices (none shown separately) for determining the geodetic position of the survey vessel 88 and the various seismic sensors 94.

As illustrated, the marine survey system 86 may further comprise an apparatus 10 towed by the survey vessel 88 (or a different vessel) in the body of water 90. A source cable 96 may couple the apparatus 10 to the survey vessel 88. The apparatus 10 may be towed in the body of water 90 at a depth ranging from 0 meters to about 120 meters, for example, or even deeper. At selected times, the seismic source 12 (not in site) may be triggered, for example, by the recording system 92, to generate acoustic energy.

In some embodiments, the marine survey system 86 may further comprise at least one streamer 98 towed by the survey vessel 88 (or a different vessel) to detect the acoustic energy that originated from the seismic source 12 after it has interacted, for example, with formations 100 below the water bottom 102. As illustrated, both the apparatus 10 and the streamer 98 may be towed above the water bottom 102. The streamer 98 may contain seismic sensors 94 thereon at spaced apart locations. In some embodiments, more than one streamer 98 may be towed by the survey vessel 88, which may be spaced apart laterally, vertically, or both laterally and vertically. While not shown, some seismic surveys locate seismic sensors 94 on ocean bottom cables or nodes in addition to, or instead of, streamer 98. The seismic sensors 94 may be any type of seismic sensors 94 known in the art, including hydrophones, geophones, particle velocity sensors, particle displacement sensors, particle acceleration sensors, or pressure gradient sensors, for example. By way of example, the seismic sensors 94 may generate response signals, such as electrical or optical signals, in response to detected acoustic energy. Signals generated by the seismic sensors 94 may be communicated to the recording system 92. The detected energy may be used to infer certain properties of the subsurface rock, such as structure, mineral composition and fluid content, thereby providing information useful in the recovery of hydrocarbons.

In non-limiting embodiments, a geophysical data product indicative of certain properties of the subsurface rock may be produced from the detected energy. The geophysical data product may include processed seismic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Advantageously, the seismic sources 12 disclosed herein may display a low resonance frequency in the seismic frequency range of interest. In particular embodiments, the seismic sources 12 may display a resonance frequency (when submerged in water at a depth of from about 0 meters to about 300 meters or alternatively from about 30 meters to about 300 meters) in the seismic frequency range of interest between about 1 Hz to about 200 Hz. In alternative embodiments, the seismic sources 12 may display at least one resonance frequency (when submerged in water at a depth of from about 0 meters to about 300 meters or alternatively from about 30 meters to about 300 meters) between about 0.1 Hz and about 100 Hz and, alternatively, between about 0.1 Hz and about 10 Hz. In some embodiment, the seismic sources 12 may display at least one resonance frequency of about 10 Hz or lower (when submerged in water at a depth of from about 0 meters to about 300 meters or alternatively from about 30 meters to about 300 meters).

One of the many potential advantages of the systems and methods of the present invention, only some of which are disclosed herein, is that an increased pressure differential may be tolerated by the seismic source 12 by use of the external driver 14. For example, the tolerable pressure differential may increase from a few meters to +/−1 meter, thus enabling use of the seismic source 12 in rougher weather conditions with reduced burden on the static pressure compensation system. In addition, in some examples, the seismic source 12 may be more reliable in operation due to elimination of the fragile piezoelectric bodies, the bond between the piezoelectric bodies and base plates 20*a*, 20*b*, and the voltage required to energize the piezoelectric bodies. Another one of the many potential advantages of the systems and methods of the present invention may be that a seismic source 12 energized by the external driver 14 may be much less costly than use of the piezoelectric bodies while also having a potentially shorter development time to the commercial production. Seismic sources 12 without the piezoelectric bodies may also have less costly routine maintenance due to their reduced costs. Moreover, no special amplifiers may be required wherein multiple external drivers 14 may be wired in series/parallel combinations to provide the desired impedance. Additionally, it is believed that the output may be increased per seismic source 12, reducing system cost and size, wherein base plates 20, 20*b* that may be all aluminum, for example, may be able to be driven harder. Should there be a catastrophic failure of the static pressure compensation system or an event that causes the depth to change too quickly, less damage may occur if piezoelectric bodies are not used with potential repair only requiring only replacement of the benders and the electroacoustic transmitting transducers.

The foregoing figures and discussion are not intended to include all features of the present techniques to accommodate a buyer or seller, or to describe the system, nor is such figures and discussion limiting but exemplary and in the spirit of the present techniques.

What is claimed is:

1. An apparatus for generating acoustic energy, the apparatus comprising:
    a seismic source comprising an internal cavity configured to contain a fluid;
    a piston external to the seismic source and in fluid communication with the internal cavity, wherein the piston is operable to energize the fluid in the internal cavity of the seismic source; and
    a linear motor coupled to the piston.

2. The apparatus of claim 1, wherein the seismic source comprises a pair of base plates positioned to provide the internal cavity between the pair of base plates, the pair of base plates being operable to bend in response to the linear motor energizing the fluid to generate the acoustic energy.

3. The apparatus of claim 2, wherein the seismic source further comprises a hoop that engages outer edges of the pair of base plates to secure the pair of base plates to one another.

4. The apparatus of claim 1, wherein the seismic source further comprises a conduit at least partially between the seismic source and the linear motor to permit communication of the fluid there between.

5. The apparatus of claim 1, further comprising a fluid reservoir disposed external to the seismic source, wherein the fluid reservoir is configured to contain a reservoir fluid, wherein the piston is disposed between the fluid reservoir and the internal cavity.

6. The apparatus of claim 1, wherein the fluid in the internal cavity comprises air.

7. The apparatus of claim 1, wherein the linear motor is operable to translate the piston to energize the fluid.

8. The apparatus of claim 1, further comprising a chamber housing, wherein the chamber housing comprises a chamber in which the piston is disposed.

9. The apparatus of claim 8, further comprising a fluid reservoir disposed external to the seismic source, wherein the fluid reservoir is configured to contain a reservoir fluid, wherein the piston is disposed between the fluid reservoir and the internal cavity.

10. The apparatus of claim 9, wherein the chamber comprises an outlet on one side of the piston, wherein the outlet is in fluid communication with the internal cavity of the seismic source; and wherein the apparatus further comprises a resonance pipe disposed on an opposite side of the piston from the outlet, wherein the resonance pipe fluidically couples the fluid reservoir to the chamber.

11. The apparatus of claim 10, wherein the linear motor is disposed in the fluid reservoir.

12. The apparatus of claim 8, wherein a seal is formed between the piston and the chamber housing.

13. The apparatus of claim 1, further comprising a linear position encoder for encoding position of linear motor.

14. An apparatus for generating acoustic energy, the apparatus comprising:
a plurality of seismic sources, each seismic source comprising a pair of base plates positioned to provide an internal cavity between the pair of base plates, wherein the internal cavity comprises one or more ports for transporting a source fluid to and from the internal cavity;
a fluid reservoir disposed external to the seismic sources, wherein the fluid reservoir is configured to contain a reservoir fluid;
a piston disposed between the plurality of seismic sources and the fluid reservoir and in fluid communication with the internal cavity of each of the seismic sources, wherein the piston is operable to energize the source fluid in the internal cavity of each of the seismic sources to cause the corresponding pair of base plates to bend and generate the acoustic energy; and
a linear motor coupled to the piston for causing the piston to translate.

15. The apparatus of claim 14, wherein the source fluid and the reservoir fluid each individually comprise air.

16. The apparatus of claim 14, further comprising a chamber housing, wherein the chamber housing comprises a chamber in which the piston is disposed.

17. The apparatus of claim 14, wherein the chamber comprises an outlet on one side of the piston, wherein the outlet is in fluid communication with the internal cavity of the at least one of the seismic sources; and wherein the apparatus further comprises a resonance pipe disposed on an opposite side of the piston from the outlet, wherein the resonance pipe fluidically couples the fluid reservoir to the chamber.

18. The apparatus of claim 14, wherein the apparatus further comprises a plurality of linear motors arranged in series, wherein each of the plurality of external drivers is coupled to a corresponding piston for energizing the source fluid, wherein the plurality of linear motors comprises the linear motor.

19. The apparatus of claim 15, further comprising more than one of the seismic source arranged in a stack.

20. A method comprising:
driving a piston with a linear motor to energize a fluid within an internal cavity formed between a pair of base plates to cause the pair of base plates to bend and generate acoustic energy.

21. The method of claim 20, further comprising: towing a seismic source in a body of water, wherein the seismic source comprises the pair of base plates; and detecting the acoustic energy that originated from the seismic source after interacting with subsurface rock.

22. The method of claim 21, further comprising: producing a geophysical data product from the detected acoustic energy; and storing the geophysical data product on a tangible, non-volatile machine-readable medium suitable for importing onshore.

23. The method of claim 20, further comprising resonating a reservoir fluid on an opposite side of the piston from the fluid to assist the piston in energizing the fluid, wherein the driving the piston comprises translating the piston in a chamber formed in a chamber housing, wherein the reservoir fluid resonates through a resonance pipe between a fluid reservoir and the chamber.

* * * * *